United States Patent
Watabe

(10) Patent No.: US 11,935,226 B2
(45) Date of Patent: Mar. 19, 2024

(54) IMAGE PROCESSING APPARATUS FOR IMAGE INSPECTION, IMAGE PROCESSING METHOD, AND STORAGE MEDIUM

(71) Applicant: CANON KABUSHIKI KAISHA, Tokyo (JP)

(72) Inventor: Hiroki Watabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/200,076

(22) Filed: Mar. 12, 2021

(65) Prior Publication Data
US 2021/0295488 A1    Sep. 23, 2021

(30) Foreign Application Priority Data
Mar. 17, 2020 (JP) .................................. 2020-046694

(51) Int. Cl.
*G06T 7/60* (2017.01)
*G06T 7/00* (2017.01)
*G06V 10/75* (2022.01)

(52) U.S. Cl.
CPC .............. *G06T 7/001* (2013.01); *G06T 7/60* (2013.01); *G06T 2207/30144* (2013.01); *G06V 10/751* (2022.01)

(58) Field of Classification Search
CPC . G06T 7/001; G06T 7/60; G06T 2207/30144; G06V 10/751
USPC ................................................ 382/112, 100
See application file for complete search history.

(56) References Cited

U.S. PATENT DOCUMENTS

| | | | |
|---|---|---|---|
| 6,266,153 B1* | 7/2001 | Davidson | G06K 15/12 358/1.9 |
| 6,275,600 B1* | 8/2001 | Banker | H04N 1/00058 358/406 |
| 6,539,106 B1* | 3/2003 | Gallarda | G06V 10/751 382/286 |
| 6,556,693 B1* | 4/2003 | Dobashi | G01B 11/285 359/487.02 |

(Continued)

FOREIGN PATENT DOCUMENTS

| | | |
|---|---|---|
| JP | 2005322139 A | 11/2005 |
| JP | 2010071951 A | 4/2010 |
| JP | 2015178970 A | 10/2015 |

*Primary Examiner* — Sheela C Chawan
(74) *Attorney, Agent, or Firm* — CANON U.S.A., INC. IP Division

(57) ABSTRACT

An image processing apparatus includes first, second, and third acquisition units, a setting unit, a calculation unit, and a processing unit. The first acquisition unit acquires information regarding a setting for inspecting an image. The second acquisition unit acquires first data that is data of a reference image representing a target print result. The third acquisition unit acquires second data that is data of a printed image to be inspected. The setting unit sets a comparison area including a pixel of interest in each of the reference image and the printed image based on the information and the first data. The pixels of interest correspond to an identical pixel position. The calculation unit calculates a density difference between the comparison areas based on the first data and the second data. The processing unit inspects the printed image based on the first data, the second data, and the density difference.

20 Claims, 14 Drawing Sheets

(56) References Cited

U.S. PATENT DOCUMENTS

| | | | | |
|---|---|---|---|---|
| 7,066,566 B2* | 6/2006 | Furukawa | ............... | G06T 7/001 |
| | | | | 358/1.9 |
| 9,704,236 B2* | 7/2017 | Kogan | ............... | H04N 1/00063 |
| 11,126,125 B1* | 9/2021 | Lin | ........................ | G03G 15/55 |
| 2005/0285947 A1* | 12/2005 | Grindstaff | ............... | G06T 7/231 |
| | | | | 348/208.4 |
| 2014/0093139 A1* | 4/2014 | Yamagishi | ......... | H04N 1/00005 |
| | | | | 382/112 |
| 2019/0026879 A1* | 1/2019 | Batikoff | .................. | G06T 5/006 |
| 2019/0114759 A1* | 4/2019 | Azumai | .................... | G06T 7/74 |
| 2019/0212955 A1* | 7/2019 | Gutierrez | ........... | G06K 15/1885 |

* cited by examiner

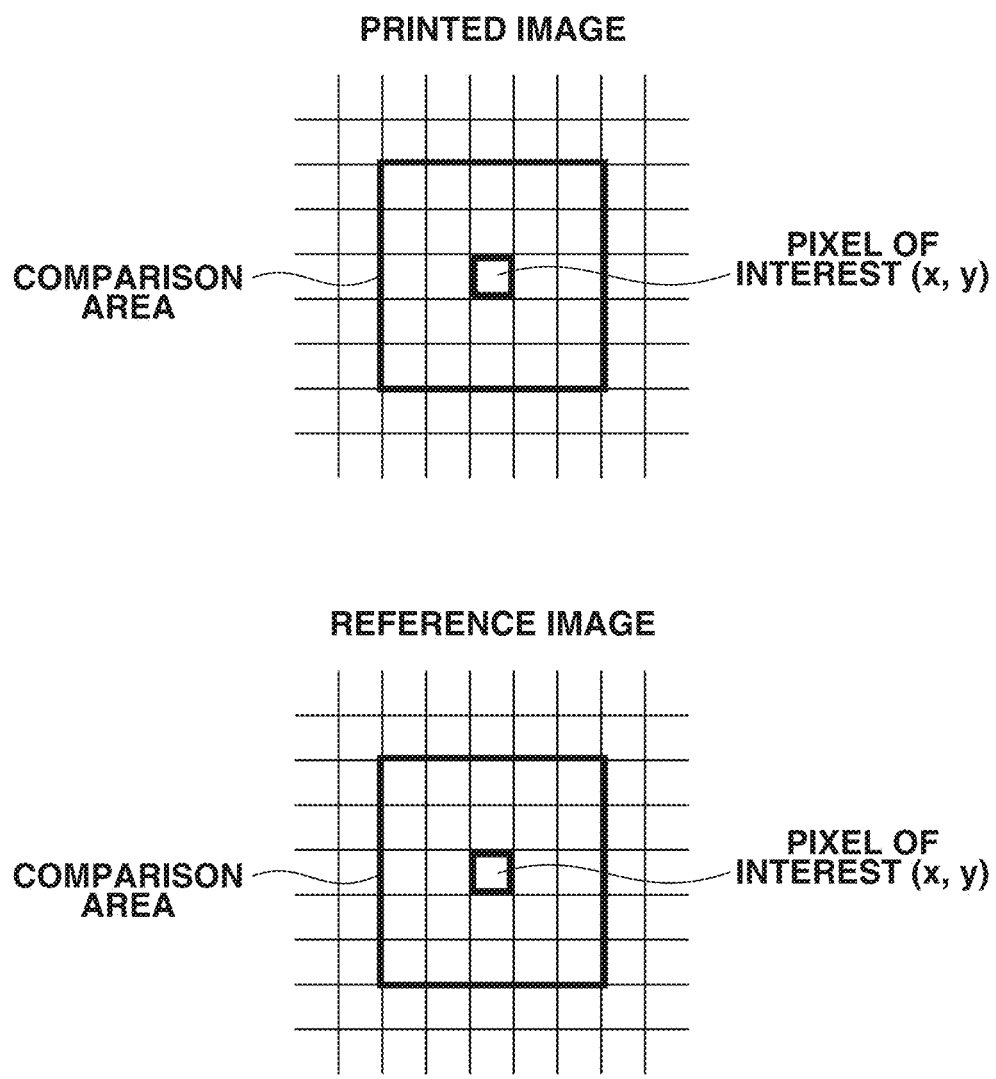

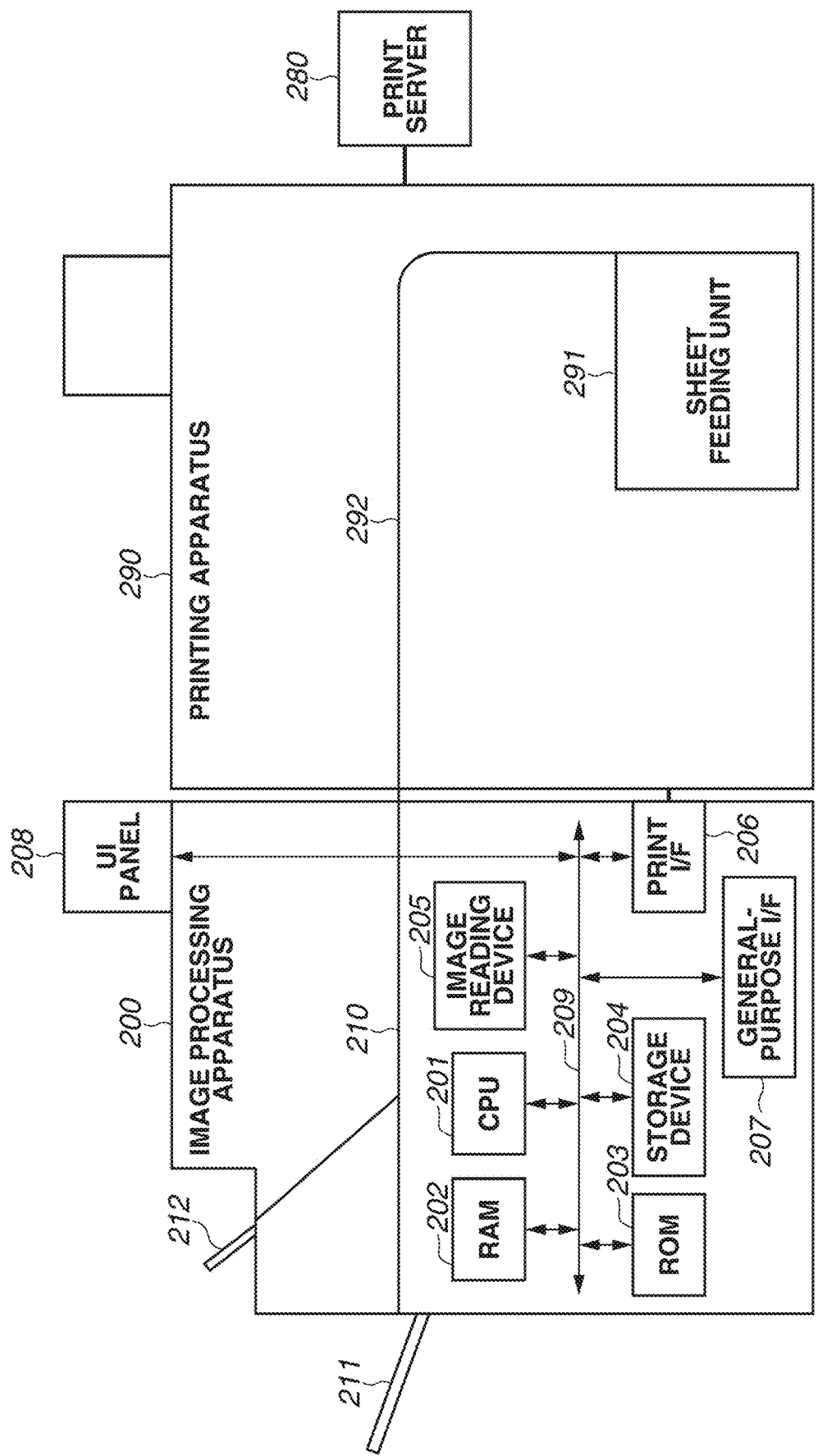

| IMAGE | RESULT |
|---|---|
| Img_00001 | PASS |
| Img_00002 | PASS |
| Img_00003 | PASS |
| Img_00004 | FAIL |
| Img_00005 | PASS |
| Img_00006 | PASS |
| Img_00007 | PASS |
| Img_00008 | PASS |
| Img_00009 | PASS |
| Img_00010 | PASS |
| ⋮ | ⋮ |

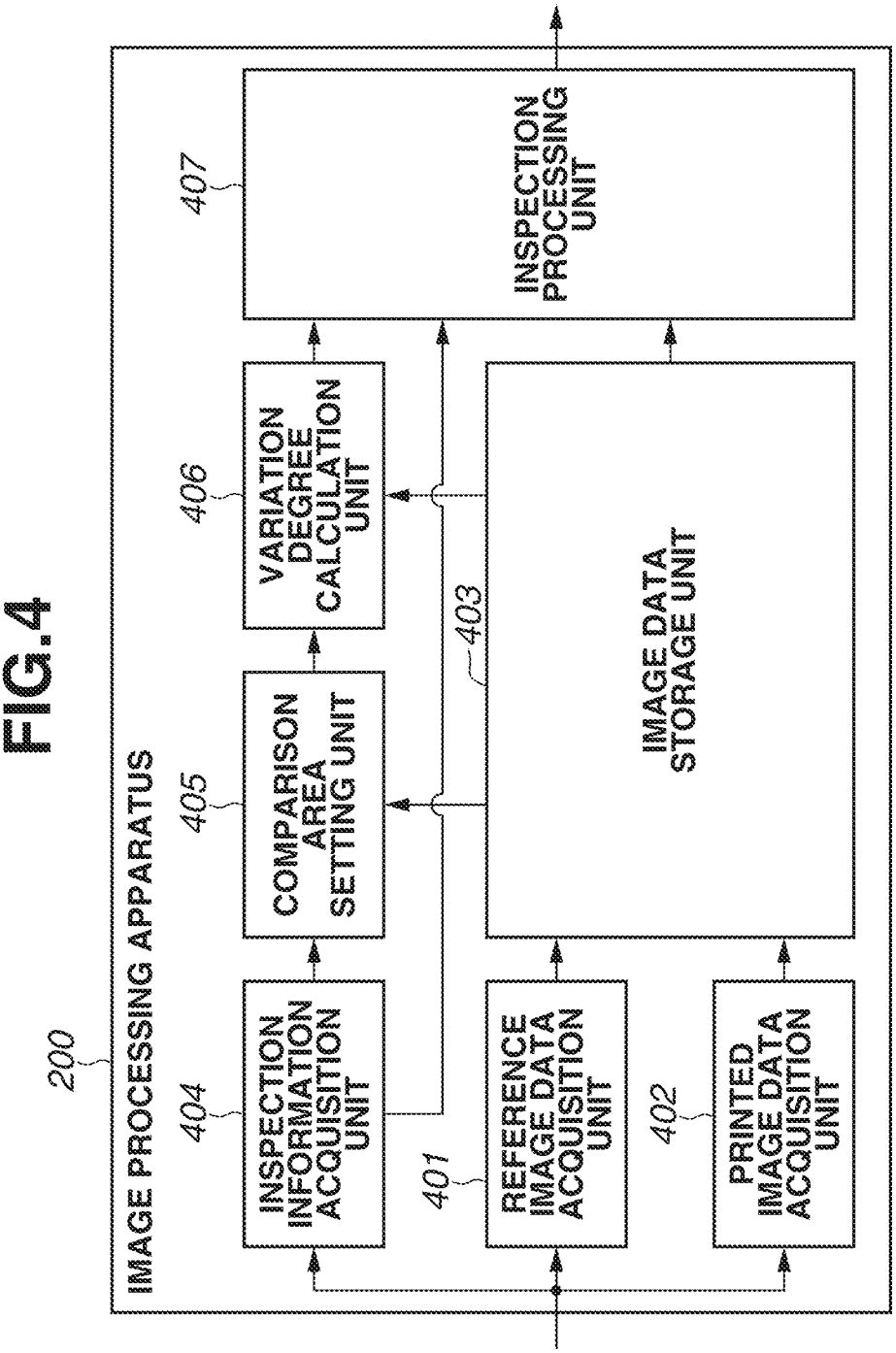

501

502

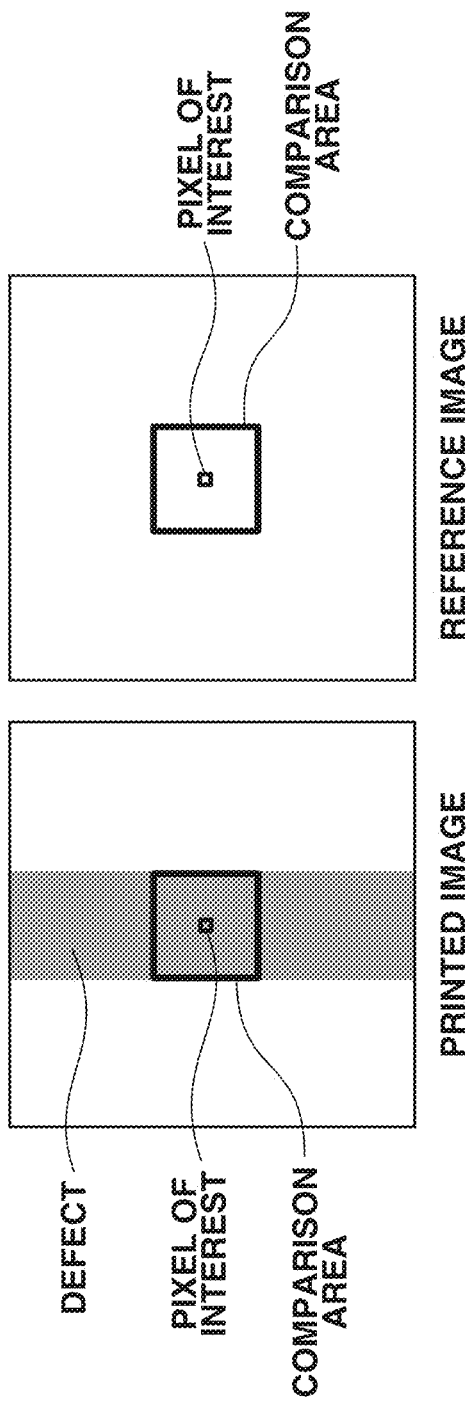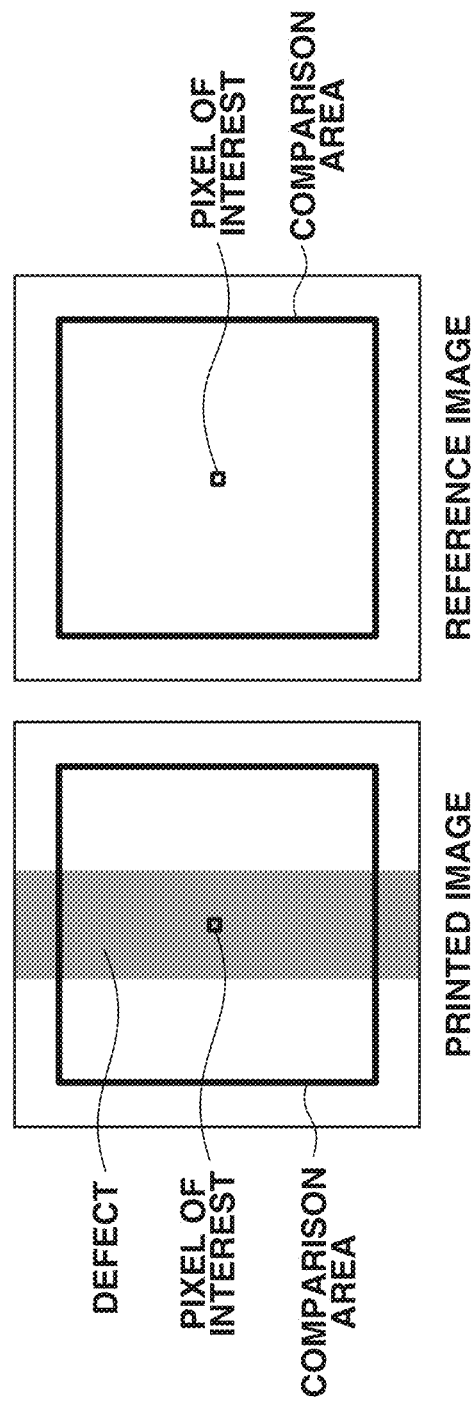

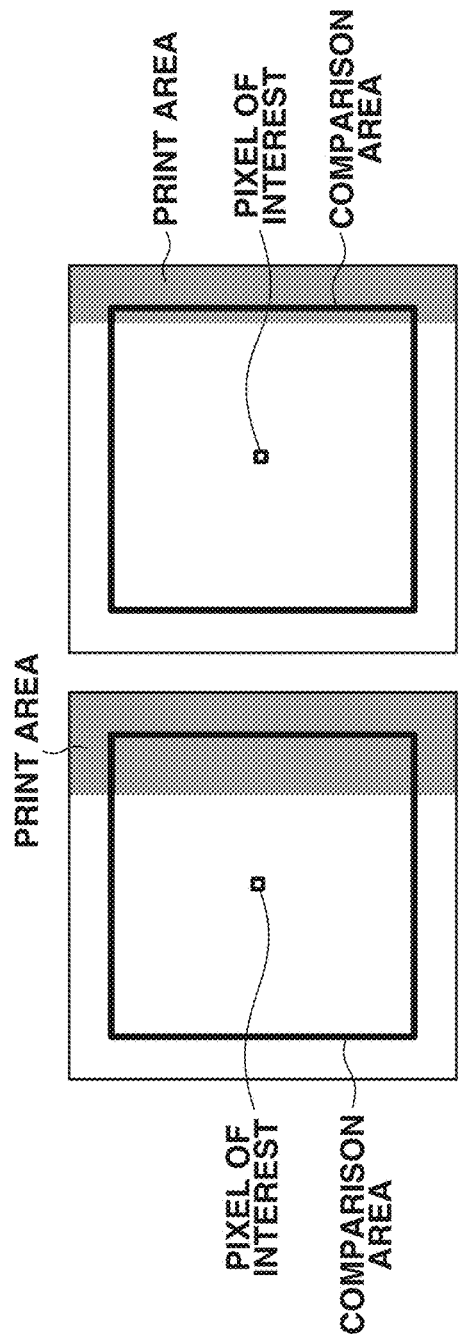
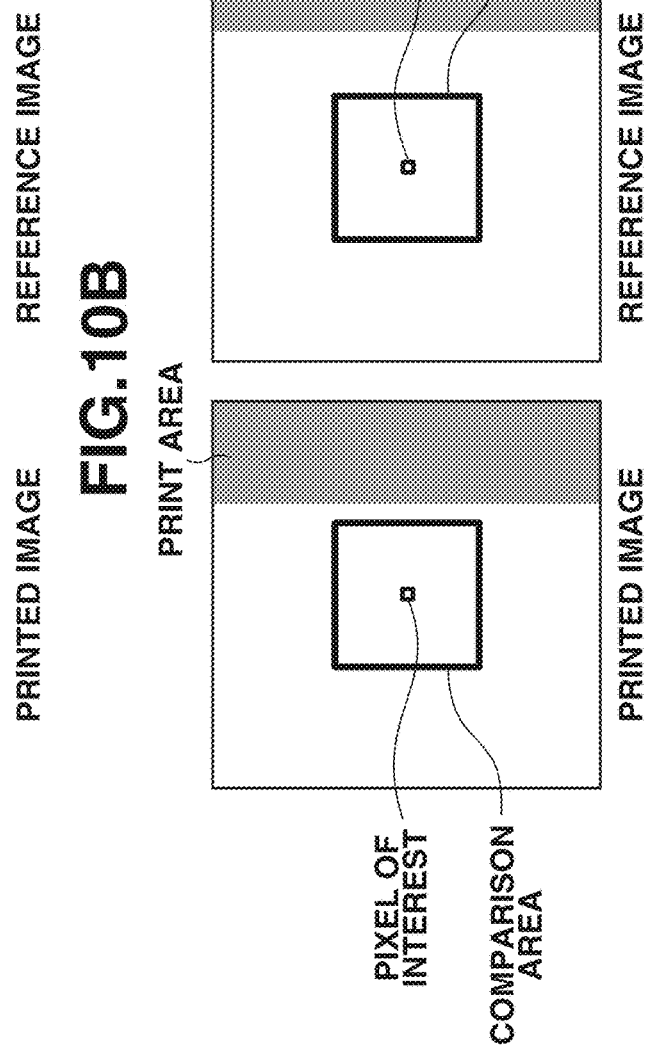

DEFECT CONTRAST: LARGE

DEFECT CONTRAST: SMALL

IMAGE PROCESSING APPARATUS FOR IMAGE INSPECTION, IMAGE PROCESSING METHOD, AND STORAGE MEDIUM

BACKGROUND

Technical Field

The present disclosure relates to an image processing technique for inspecting printed products for the presence or absence of defects.

Description of the Related Art

In the printing industry, inspection (verification) is conventionally performed after output of printed products in order to ensure that the final products to be delivered to customers have no defects or problems in quality. In recent years, automation techniques for the inspection have been developed because it costs more to manually perform the inspection. One example of the techniques is as follows. First, image data of a non-defective printed product (hereinafter referred to as reference image data) is generated in advance. Next, image data of a printed product to be inspected (hereinafter referred to as printed image data) is acquired by scanning, image capturing, or the like. Then, inspection is performed by comparing these two pieces of image data. If there is a large difference exceeding a predetermined acceptable range between the reference image data representing the non-defective product and the printed image data subject to inspection, the printed image data is determined as defective.

Densities and tones of printed products that are output based on the same input data may vary depending on the condition of a printing apparatus at the time of the output. An inspection technique considering this case is discussed in Japanese Patent Application Laid-Open No. 2015-178970. Japanese Patent Application Laid-Open No. 2015-178970 discusses the technique in which an image to be used in defect inspection of a scanned image is re-generated and the re-generated image is compared with the scanned image in a case where a change occurs in a printing apparatus due to calibration or other factors.

In the technique discussed in Japanese Patent Application Laid-Open No. 2015-178970, the image to be used in the defect inspection is re-generated only in a case where a clear change occurs in the printing apparatus due to calibration or other factors. Thus, the technique cannot deal with a density variation that occurs due to, for example, a variation in toner adhesion amount or a variation in light amount from a light source used for image scanning, because the density variation does not cause a clear change in the printing apparatus. Consequently, in some cases, the print output of the printing apparatus cannot be inspected with high accuracy.

SUMMARY

The present disclosure is directed to providing a process for inspecting the print output of a printing apparatus with high accuracy even in a case where no clear change occurs in the printing apparatus.

According to an aspect of the present disclosure, an image processing apparatus includes first, second, and third acquisition units, a setting unit, a calculation unit, and a processing unit. The first acquisition unit is configured to acquire information regarding a setting for inspecting an image. The second acquisition unit is configured to acquire first data that is data of a reference image representing a target print result. The third acquisition unit is configured to acquire second data that is data of a printed image to be inspected. The setting unit is configured to set a comparison area including a pixel of interest in each of the reference image and the printed image based on the information and the first data. The pixels of interest in the reference image and the printed image correspond to an identical pixel position. The calculation unit is configured to calculate a density difference between the comparison areas in the reference image and the printed image based on the first data and the second data. The processing unit is configured to inspect the printed image based on the first data, the second data, and the density difference.

Further features of the disclosure will become apparent from the following description of exemplary embodiments with reference to the attached drawings.

BRIEF DESCRIPTION OF THE DRAWINGS

FIG. 1 is a schematic diagram illustrating a relationship between a pixel of interest and a comparison area.

FIG. 2 is a diagram illustrating an entire configuration of a printing system including an image processing apparatus.

FIG. 4 is a block diagram illustrating a functional configuration of the image processing apparatus.

FIGS. 9A and 9B are schematic diagrams illustrating processing for determining a size of a comparison area.

FIGS. 10A and 10B are schematic diagrams illustrating processing for correcting the size of the comparison area.

DESCRIPTION OF THE EMBODIMENTS

Figures 3A, 3B:
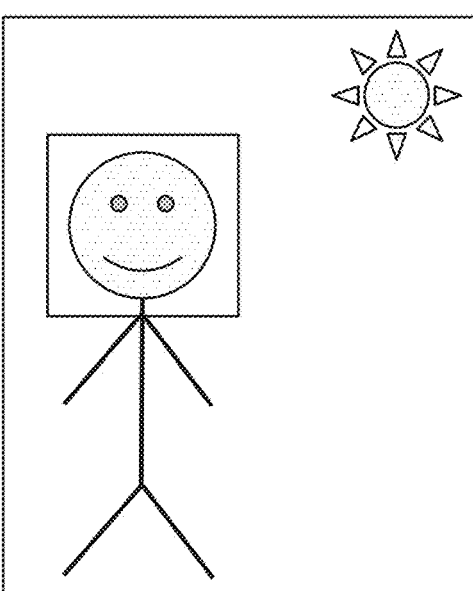
FIGS. 3A and 3B are schematic diagrams each illustrating an example of a user interface (UI) screen.

Exemplary embodiments of the present disclosure will be described below with reference to the attached drawings. The exemplary embodiments described below do not necessarily limit the present disclosure. Furthermore, not all combinations of features described in the exemplary embodiments are essential for solving means of the present disclosure.

A first exemplary embodiment will be described. In the present exemplary embodiment, inspection is performed considering the average pixel value of an area (hereinafter referred to as a comparison area) including and around a pixel of interest in a reference image illustrated in FIG. 1 and the average pixel value of a comparison area in a printed image illustrated in FIG. 1. The inspection according to the present exemplary embodiment is performed based on an absolute value of a difference between an image (reference image) representing a target print result and an image (printed image) to be inspected.

<Configuration of Printing System>

FIG. 2 illustrates an example of an entire configuration of a printing system that includes an image processing apparatus 200 and is capable of outputting and inspecting printed products. The printing system according to the present exemplary embodiment includes the image processing apparatus 200, a print server 280, and a printing apparatus 290. The print server 280 generates a print job of a document to be printed, and inputs the print job to the printing apparatus 290. The printing apparatus 290 forms an image on a recording medium (printing sheet) based on the print job input from the print server 280. The printing apparatus 290 includes a sheet feeding unit or a sheet feeder 291, and a user places the printing sheet in the sheet feeding unit 291 in advance. When the print job is input to the printing apparatus 290, the printing apparatus 290 conveys the sheet placed in the sheet feeding unit 291 along a conveyance path 292 to form an image on one side or both sides of the sheet, and then sends the sheet with the image formed thereon to the image processing apparatus 200.

The image processing apparatus 200 performs defect inspection of a printed product to be inspected. The printed product to be inspected is output by the printing apparatus 290 forming an image on the sheet. The printed product is then conveyed along the conveyance path 292 and inspected by the image processing apparatus 200. The image processing apparatus 200 functions as an inspection processing apparatus. The image processing apparatus 200 includes a central processing unit (CPU) or a programmable processor 201, a random access memory (RAM) 202, and a read-only memory (ROM) 203. The image processing apparatus 200 further includes a storage device 204, an image reading device 205, a print interface (I/F) 206, a general-purpose I/F 207, a user interface (UI) panel 208, and a main bus 209. The image processing apparatus 200 further includes a conveyance path 210 that is connected to the conveyance path 292 of the printing apparatus 290 and conveys the printed product, an output tray 211 for the printed product that has passed the inspection, and an output tray 212 for the printed product that has failed the inspection because a defect is found therein. In the printing system, the storage device 204, the image reading device 205, the UI panel 208, the conveyance path 210, the output tray 211, and the output tray 212 may be provided on the outside of the image processing apparatus 200.

The CPU 201 is a processor for comprehensively controlling each unit in the image processing apparatus 200. The RAM 202 functions as a main memory and a work area of the CPU 201. The ROM 203 stores programs to be executed by the CPU 201. When executed by the CPU 201, the programs or instructions cause the CPU 201 to perform operations or to function as the various units as described in the following. The storage device 204 stores an application to be executed by the CPU 201, data to be used in image processing, and the like. The image reading device 205 is a scanner that scans one side or both sides of the printed product conveyed from the printing apparatus 290 to the conveyance path 210, and acquires the scanned data as image data.

The print I/F 206 is connected to the printing apparatus 290. The print I/F 206 synchronizes the processing timing of the printed product between the image processing apparatus 200 and the printing apparatus 290. The image processing apparatus 200 receives and transmits an operating state notification from and to the printing apparatus 290 via the print I/F 206. The general-purpose I/F 207 is a serial bus interface, such as a Universal Serial Bus (USB) interface or an Institute of Electrical and Electronics Engineers (IEEE) 1394 interface, that enables the user to carry data such as log data. The UI panel 208 is a display device such as a liquid crystal display and functions as a user interface for notifying the user of the current state or settings of the image processing apparatus 200 as illustrated in FIG. 3A. The UI panel 208 may include an input device such as a touch panel or a button, and can receive an inspection instruction from the user as illustrated in FIG. 3B. The input device may be provided separately from the UI panel 208, like a mouse or a keyboard. The main bus 209 is a transmission path for connecting the modules of the image processing apparatus 200 with one another.

The image processing apparatus 200 performs inspection processing (described below) based on the image data of the printed product that is scanned by the image reading device 205 while being conveyed along the conveyance path 210 after being sent from the printing apparatus 290. The printed product that has passed the inspection is conveyed to the output tray 211 for the passed product, whereas the printed product that has failed the inspection is conveyed to the output tray 212 for the failed product. Accordingly, only the printed products confirmed to satisfy the quality criteria can be collected in the output tray 211 as the printed products to be delivered.

<Functional Configuration of Image Processing Apparatus>

FIG. 4 illustrates a functional configuration of the image processing apparatus 200. The image processing apparatus 200 includes a reference image data acquisition unit 401, a printed image data acquisition unit 402, an image data storage unit 403, an inspection information acquisition unit 404, a comparison area setting unit 405, a variation degree calculation unit 406, and an inspection processing unit 407. The term "unit" may refer to a functional module as part of a processing chain, or a device, processor, or physical entity.

The reference image data acquisition unit 401 acquires the reference image data representing the reference image that serves as a reference for the inspection. The reference image data is generated in advance based on the scanned image obtained by scanning the printed product output from the printing apparatus 290. The printed image data acquisition unit 402 acquires the printed image data representing the printed image to be inspected. The printed image data is generated by the image reading device 205 scanning the printed product on the conveyance path 210. The image data acquired by the reference image data acquisition unit 401 and the image data acquired by the printed image data acquisition unit 402 are stored in the image data storage unit 403. The inspection information acquisition unit 404 acquires inspection information set in advance. The comparison area setting unit 405 sets comparison areas for comparing the reference image and the printed image. The variation degree calculation unit 406 obtains predetermined indexes from the respective comparison areas in the reference image and the printed image, and compare the obtained indexes to calculate the degree of variation in density (the density difference). More specifically, the variation degree calculation unit 406 calculates the difference between the average pixel value of the comparison area centered on the pixel of interest in the reference image and the average pixel value of the comparison area centered on the pixel of interest in the printed image.

Figure 8:
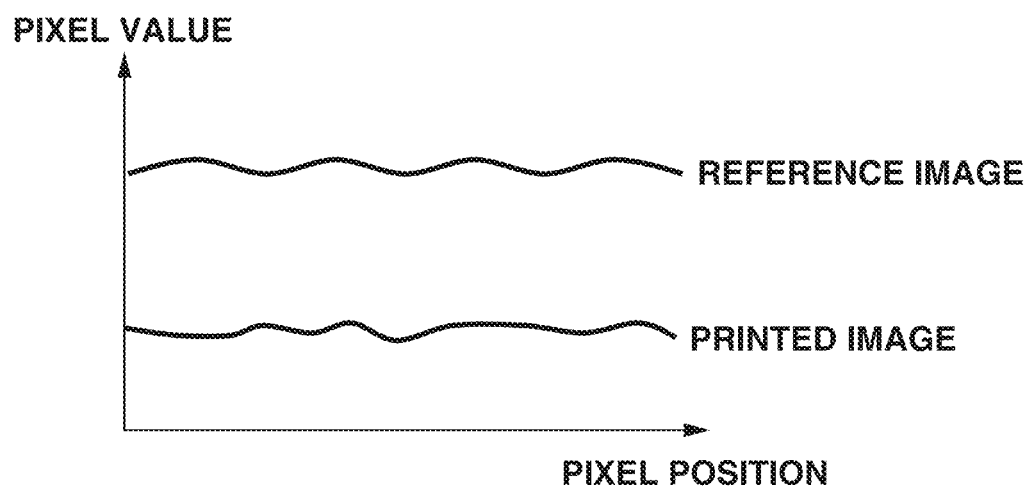
FIG. 8 is a schematic diagram illustrating a density variation between a reference image and a printed image.

The inspection processing unit 407 inspects the printed image represented by the printed image data, based on the reference image data, the printed image data, and the degree of variation in density. The inspection processing by the inspection processing unit 407 will be described in detail next. A uniform density variation may occur between the reference image and the printed image due to, for example, a variation in toner adhesion amount or a variation in light amount from the light source of the image reading device 205. In a case where the uniform density variation occurs in a certain area of the printed image as illustrated in FIG. 8, if the inspection is performed using the method of comparing the difference between the values of the pixels of interest in the printed image and the reference image with a threshold value, a defect is detected from the printed image due to the uniform density variation. However, there is a case where the uniform density variation is small with little visual influence and thus is not desired to be detected as a defect. In order to handle this, in the present exemplary embodiment, a difference D (x, y) between the printed image and the reference image is calculated using Equation (1) and is used in the inspection.

$$\begin{aligned} D(x, y) &= P(x, y) - R(x, y) - (mp - mr) \\ &= (P(x, y) - (mp - mr)) - R(x, y) \\ &= P(x, y) - (R(x, y) - (mp - mr)) \\ &= (P(x, y) - mp) - (R(x, y) - mr) \end{aligned} \qquad (1)$$

In Equation (1), "P (x, y)" represents the pixel value of the pixel of interest in the printed image at the coordinates (x, y), and "R (x, y)" represents the pixel value of the pixel of interest in the reference image at the coordinates (x, y). In addition, "mp" represents the average pixel value of the comparison area centered on the pixel of interest in the printed image, and "mr" represents the average pixel value of the comparison area centered on the pixel of interest in the reference image. In Equation (1), the difference D (x, y) is calculated by subtracting a difference (mp−mr) between the average pixel values of the comparison areas from a difference between the pixel values of the pixels of interest. More specifically, the difference (mp−mr) between the average pixel values of the comparison areas is regarded as the degree of variation between the average density of the area including and around the pixel of interest in the printed image and the average density of the area including and around the pixel of interest in the reference image, and the difference D (x, y) is calculated so that the degree of variation between the average densities does not affect the inspection. In addition, as can be understood from modifications of Equation (1), the processing can be interpreted as processing for correcting the printed image or the reference image based on the variation degree and then calculating the difference between the pixel values of the pixels of interest. Furthermore, the processing can be interpreted as processing for subtracting the respective average pixel values of the comparison areas in the printed image and the reference image from the respective pixel values of the pixels of interest and then calculating the difference between the pixel values of the pixels of interest. In any of the processing described above, the difference between the printed image and the reference image is calculated in a similar manner so that the density variation does not affect the inspection. Therefore, the inspection can be performed with high accuracy.

<Defect to be Detected>

Figure 5A:
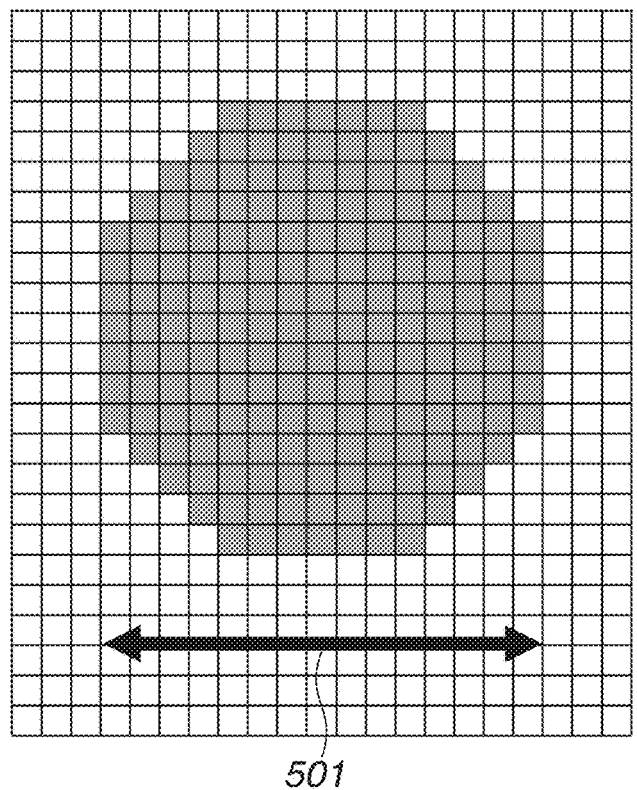
FIGS. 5A and 5B are schematic diagrams each illustrating an example of a defect to be detected.
Figure 5B:
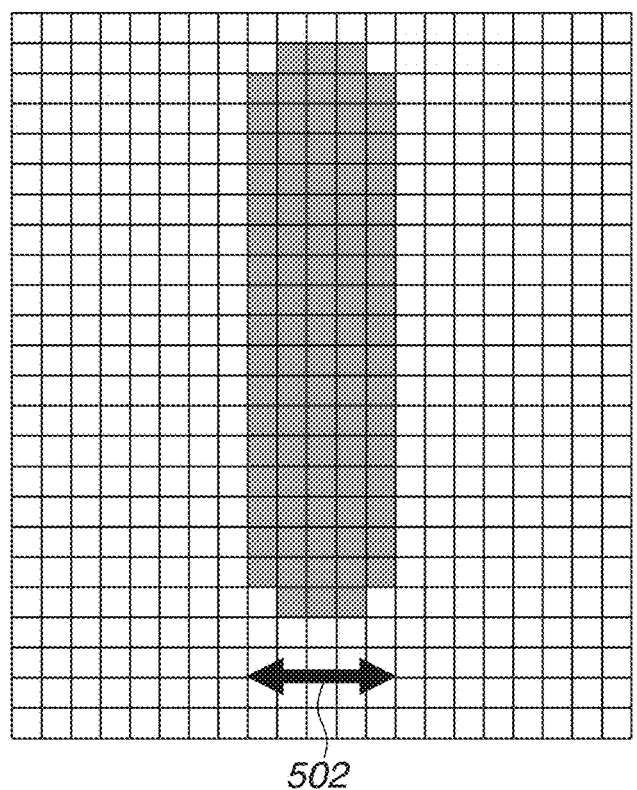

FIGS. 5A and 5B each illustrate an example of a defect to be detected. FIG. 5A illustrates a defect having a circular shape (hereinafter referred to as a circular defect). FIG. 5B illustrates a defect having a linear shape (hereinafter referred to as a linear defect). In the present exemplary embodiment, each of a diameter 501 of the circular defect and a line width 502 of the linear defect is defined as a size of the defect and used as a setting item for the inspection. Aside from the defect size, a difference in pixel value between the defect and the background may be defined as a defect contrast and used as a setting item for the inspection.

<Processing by Image Processing Apparatus>

Figure 6:
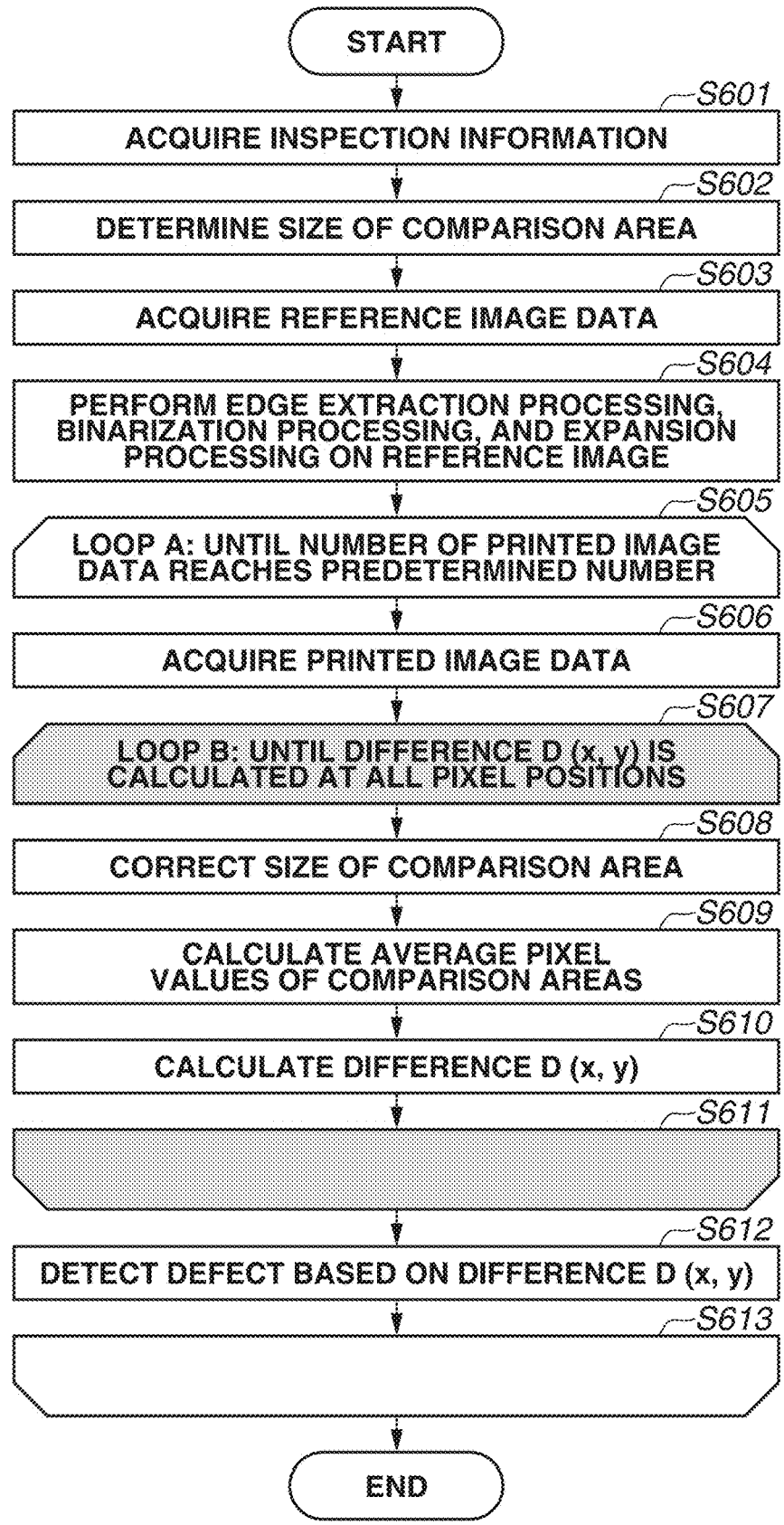
FIG. 6 is a flowchart illustrating processing performed by the image processing apparatus.

FIG. 6 is a flowchart illustrating processing performed by the image processing apparatus 200. Each step (process) is represented by adding "S" before the reference numeral. In step S601, the inspection information acquisition unit 404 acquires the inspection information set in advance. More specifically, the inspection information acquisition unit 404 acquires inspection settings made in advance by the user via the UI panel 208 as the inspection information. In the present exemplary embodiment, the size of the defect to be detected is set.

In step S602, the comparison area setting unit 405 determines the size of the comparison area based on the size of the defect acquired as the inspection information. Processing for determining the size of the comparison area will be described in detail with reference to FIGS. 9A and 9B. FIGS. 9A and 9B each illustrate an example of the printed image including a defect and an example of the reference image. To simplify the description, it is assumed here that there is no dispersion in the pixel values in each of the images and only the pixels in the area corresponding to the defect have pixel values different from those of the other area. Suppose that the comparison area falls within a defect area as illustrated in FIG. 9A. In a case where the average pixel value of the comparison area is calculated, the average pixel value matches the value of the pixel of interest in both the printed image and the reference image. Accordingly, the difference D (x, y) is zero, and it is determined that there is no defect in the printed image. Thus, it is necessary to set the size of the comparison area to be larger than the defect area as illustrated in FIG. 9B. In this case, there is a difference between the value of the pixel of interest and the average pixel value, and the defect illustrated in FIG. 9B can be detected. The comparison area setting unit 405 according to the present exemplary embodiment determines the size of the comparison area so as to be sufficiently larger than the set defect size.

Figure 7C:
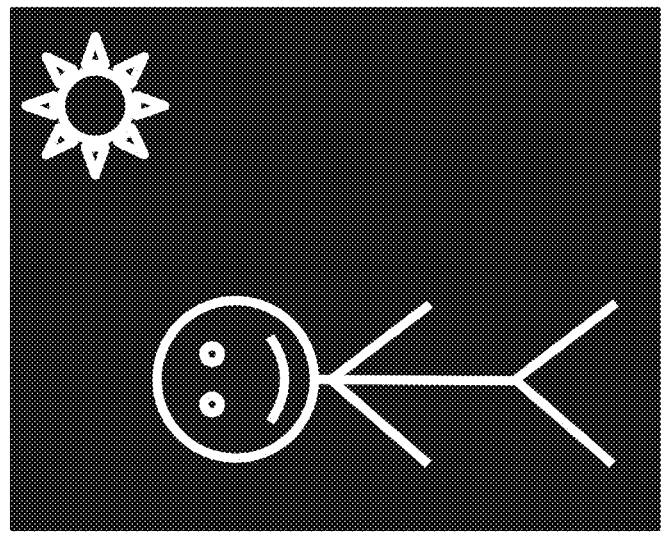
FIGS. 7A to 7C are schematic diagrams illustrating processing performed on a reference image.
Figure 7B:
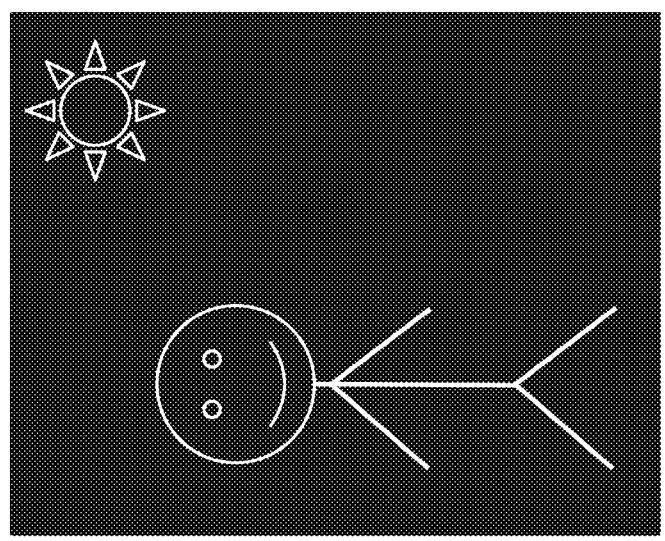
Figure 7A:
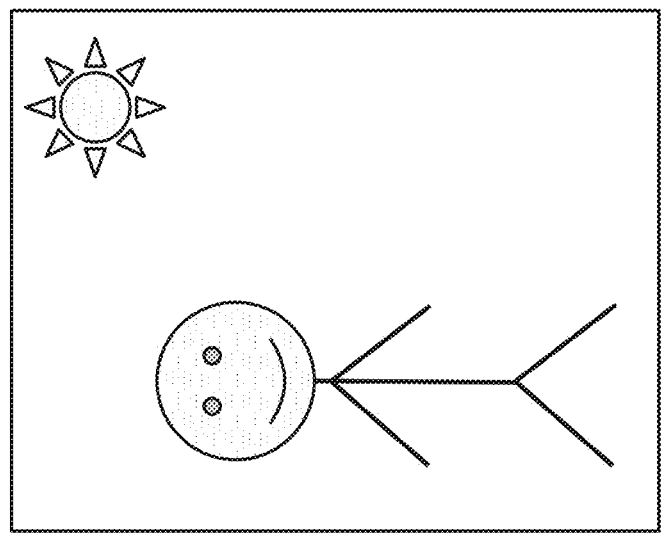

In step S603, the reference image data acquisition unit 401 acquires the reference image data representing the reference image. The reference image data has been stored in advance in the storage device 204. The acquired reference image data is stored in the image data storage unit 403. The reference image according to the present exemplary embodiment is an image in which pixel values (R, G, B) of each pixel are each represented by eight bits. In step S604, the reference image data acquisition unit 401 performs edge extraction processing on the reference image represented by the reference image data acquired in step S603, and then performs binarization processing on the reference image subjected to the edge extraction processing. The reference image data acquisition unit 401 further performs expansion processing on the reference image subjected to the binarization processing. The expansion processing is performed in units of area having the same size as the comparison area determined in step S602. FIGS. 7A to 7C illustrate the processing of step S604. In a case where the reference image represented by the reference image data acquired in step S603 is an image illustrated in FIG. 7A, a binary image illustrated in FIG. 7B is acquired by performing the edge extraction processing and the binarization processing on the reference image. The expansion processing is then performed on the binary image illustrated in FIG. 7B, so that an image illustrated in FIG. 7C can be acquired.

After the processing of step S604 is completed, the image processing apparatus 200 causes the printing apparatus 290 to start operation. While the printing apparatus 290 operates and sequentially conveys the printed products to the image processing apparatus 200, the image processing apparatus 200 repeats the processing of steps S605 to S613 for the conveyed printed products until the printing apparatus 290 completes printing on a predetermined number of sheets.

In step S606, the printed image data acquisition unit 402 acquires the printed image data generated by the image reading device 205 scanning the printed product output from the printing apparatus 290. The acquired printed image data is stored in the image data storage unit 403. The printed image represented by the printed image data according to the present exemplary embodiment is an image in which pixel values (R, G, B) of each pixel are each represented by eight bits as with the reference image.

The processing of steps S607 to S611 is repeated while the pixel of interest (x, y) is updated until the above-described difference D (x, y) between the printed image and the reference image is calculated for pixels at all pixel positions.

In step S608, the comparison area setting unit 405 corrects the size of the comparison area determined in step S602, based on the reference image subjected to the expansion processing in step S604. Processing for correcting the size of the comparison area will be described in detail. In the printed image, a local misalignment may occur due to a slight change in conveyance speed during printing or image scanning FIGS. 10A and 10B each illustrate an example of an area near the boundary of a print area and a non-print area in each of the printed image and the reference image. It is assumed here that there is no density variation between the images illustrated in each of FIGS. 10A and 10B. As illustrated in FIG. 10A, in a case where the comparison area includes the print area, the ratio of the print area in the comparison area is different between the printed image and the reference image due to a local misalignment. Accordingly, the average pixel value of the comparison area is different between the printed image and the reference image although there is no difference in actual average density between the printed image and the reference image. The difference in average pixel value affects the above-described difference D (x, y), and the inspection cannot be appropriately performed in some cases. More specifically, despite no difference between the pixel values of the pixels of interest, the absolute value of the difference D (x, y) exceeds a threshold value due to the difference (mp−mr) between the average pixel values of the comparison areas, and consequently the printed image is determined to have a defect. To avoid this, in step S608, the comparison area setting unit 405 corrects the size of the comparison area so that the comparison area does not include the print area.

In the processing of step S604, a discontinuous change in pixel value at the boundary of the print area and the non-print area is extracted as an edge. Thus, in step S608, the comparison area setting unit 405 determines whether the comparison area includes the print area (the edge) by referring to the reference image subjected to the expansion processing. If determining that the comparison area includes the edge, the comparison area setting unit 405 reduces the size of the comparison area as illustrated in FIG. 10B, thereby preventing the inclusion of the print area in the comparison area. The processing for correcting the comparison area in step S608 can prevent not only deterioration of inspection accuracy due to the print area and the non-print area, but also deterioration of inspection accuracy due to a discontinuous color change in the comparison area.

In step S609, the variation degree calculation unit 406 calculates the respective average pixel values of the comparison areas centered on the pixels of interest (x, y) in the printed image and the reference image. In step S609, the comparison area is the area centered on the pixel of interest (x, y) and having the size corrected in step S608. In step S610, the inspection processing unit 407 calculates the difference D (x, y) between the printed image and the reference image based on the pixel value of the pixel of interest in the printed image, the pixel value of the pixel of interest in the reference image, and the average pixel values of the comparison areas. As described above, the inspection processing unit 407 calculates the difference D (x, y) using Equation (1).

After the processing of steps S607 to S611 is performed on the pixels at all the pixel positions, the processing proceeds to step S612. In step S612, the inspection processing unit 407 determines whether the printed image has a defect based on the difference D (x, y) calculated through the processing of steps S607 to S611. The inspection processing unit 407 makes the determination by comparing the absolute value of the difference D (x, y) with a predetermined threshold value. The inspection processing unit 407 extracts the pixel at which the absolute value of the difference D (x, y) is the threshold value or more, and determines whether an area formed by a group of the extracted pixels is a circular defect area or a linear defect area. The determination of whether the area formed by the group of the extracted pixels is the circular defect area or the linear defect area is performed using known pattern matching.

As described above, while the printing apparatus 290 sequentially conveys the printed products to the image processing apparatus 200, the image processing apparatus 200 repeats the processing of steps S605 to S613 until the number of final printed products reaches the predetermined number. Accordingly, the passed product in which no defect is detected and the failed product in which a defect is detected can be separated from each other. By the adoption of the passed product as a final product, a predetermined number of final products ensuring a certain level of quality can be obtained.

<Effect of First Exemplary Embodiment>

As described above, the image processing apparatus 200 according to the present exemplary embodiment acquires the information regarding the settings for inspecting an image. The image processing apparatus 200 also acquires the data of the reference image representing the target print result, and the data of the printed image to be inspected. Based on the information regarding the settings and the data of the reference image, the image processing apparatus 200 sets the comparison area including the pixel of interest in each of the reference image and the printed image so that the pixels of interest in the reference image and the printed image correspond to the same or identical pixel position. Based on the data of the reference image and the data of the printed image, the image processing apparatus 200 calculates the density difference between the comparison area in the reference image and the comparison area in the printed image. The image processing apparatus 200 then inspects the printed image based on the data of the reference image, the data of the printed image, and the density difference. Accordingly, the image processing apparatus 200 can appropriately set the comparison areas for comparing the reference image and the printed image and thus can inspect the print output of the printing apparatus 290 with high accuracy.

MODIFICATION EXAMPLES

Figure 11A:
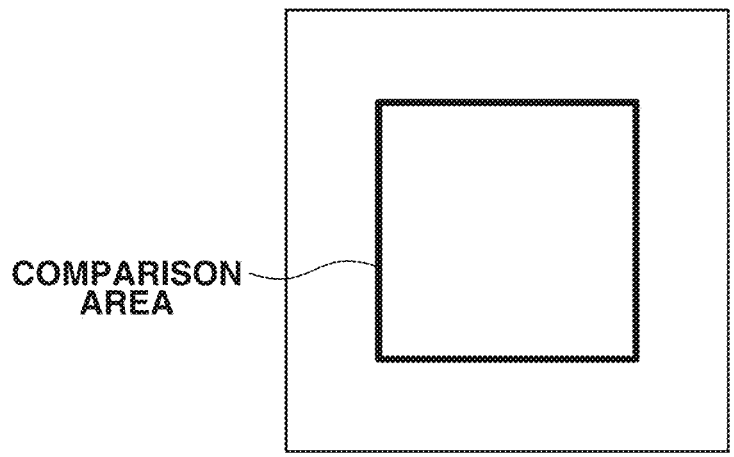
FIGS. 11A and 11B are another schematic diagrams illustrating the processing for correcting the size of the comparison area.
Figure 11B:
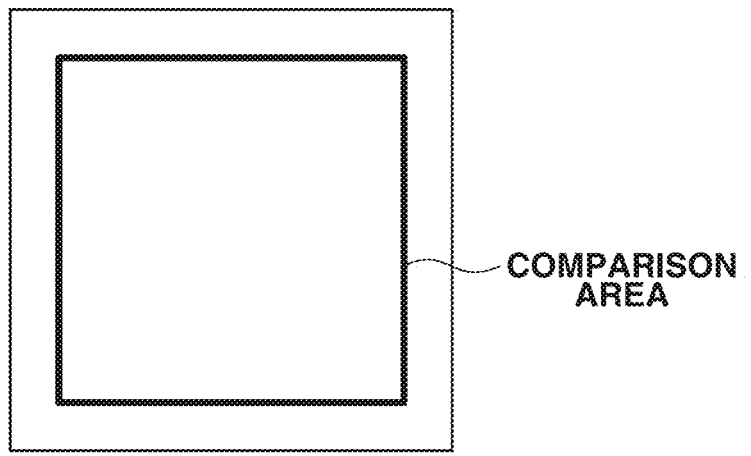

In the present exemplary embodiment, the defect size of the defect to be detected is set as the setting item for the inspection. In addition to this, the defect contrast of the defect to be detected may be set. In a case where the defect contrast of the defect to be detected is small, it is desirable to calculate the difference between the average pixel values of the comparison areas more precisely. Thus, in order to reduce the influence of noise in calculating the average pixel values of the comparison areas, it is desirable that the size of the comparison area is large. Thus, in step S602, the comparison area setting unit 405 sets the size of the comparison area so that the smaller the defect contrast acquired as the inspection information is, the larger the comparison area is. FIG. 11A illustrates the size of the comparison area that is set in a case where the defect contrast is large, whereas FIG. 11B illustrates the size of the comparison area that is set in a case where the defect contrast is small.

Figure 12A:
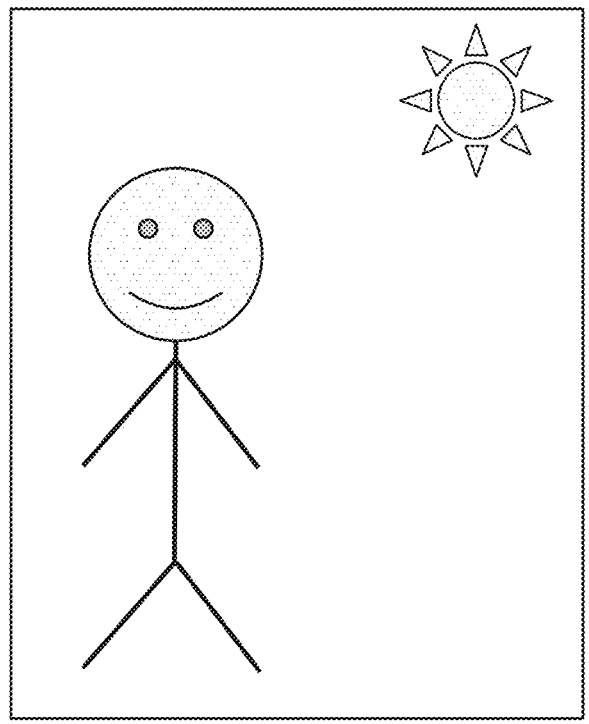
FIGS. 12A and 12B are schematic diagrams illustrating examples of inspection areas.
Figure 12B:
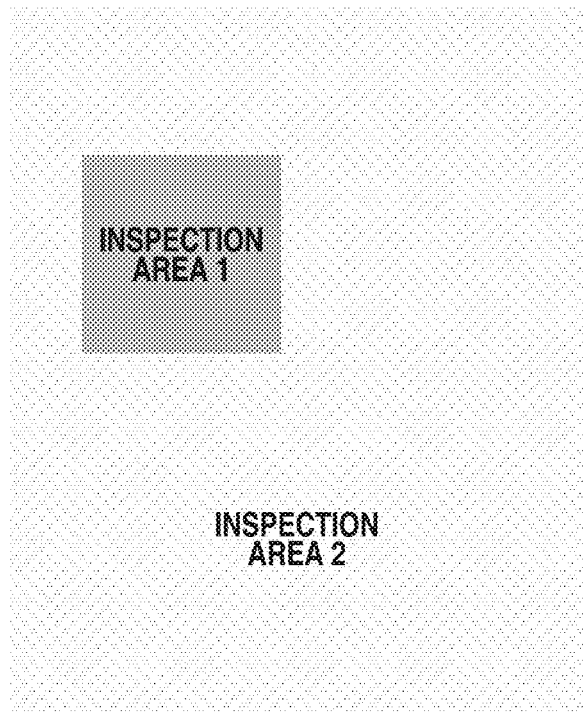
Figure 13A:
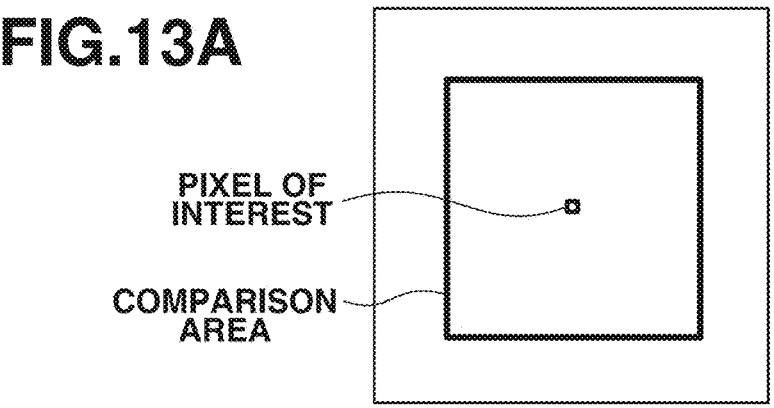
FIGS. 13A to 13D are schematic diagrams illustrating processing for correcting a shape of the comparison area.
Figure 13B:
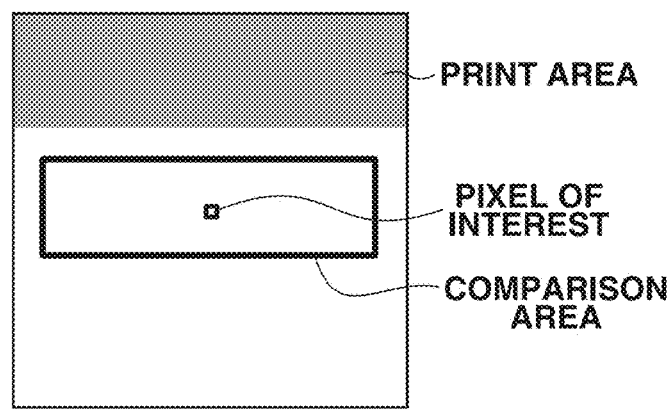
Figure 13C:
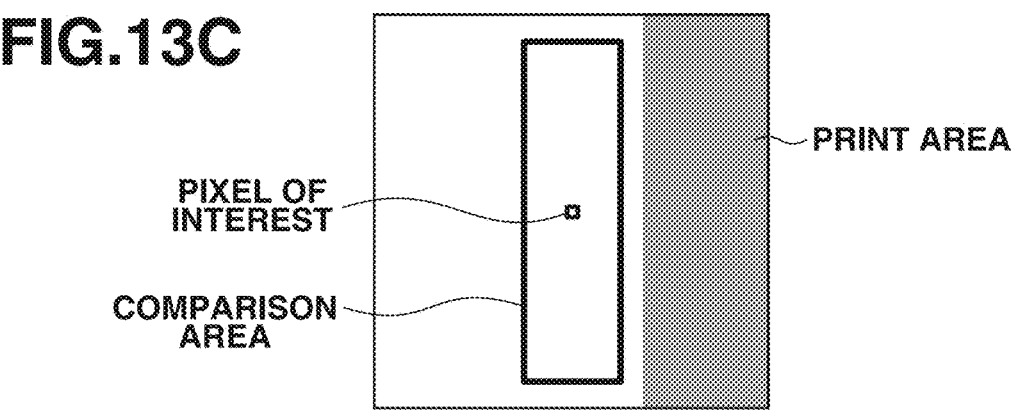
Figure 13D:
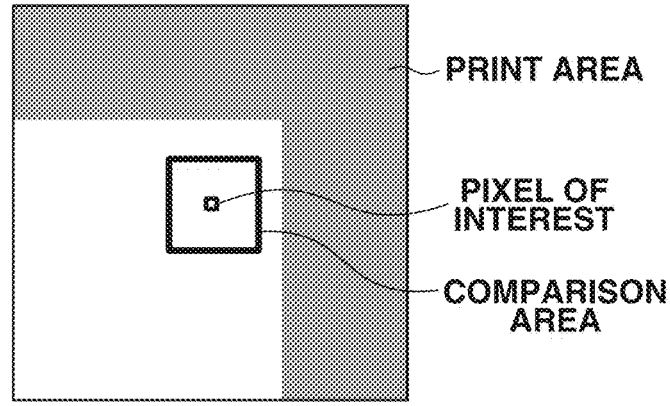

The objective of inspecting printed products is to ensure that the printed products have no problems in quality. However, if the inspection criteria are made too strict because the quality is given too much priority, the productivity is deteriorated due to an increase in the number of failed products. To avoid this, the defect size or the defect contrast of the defect to be detected may be set differently for each area of the printed image to set the inspection criteria on an area-by-area basis. For example, suppose that a printed image illustrated in FIG. 12A is inspected. In this case, there may be a need to detect even a small defect in the face area of the person but set more relaxed inspection criteria for the other area compared to the face area. In response to the need, the comparison area setting unit 405 may set the face area and the other area as separate inspection areas as illustrated in FIG. 12B and set, for each of the inspection areas, the defect size or the defect contrast of the defect to be detected. In this case, the comparison area setting unit 405 determines the size of the comparison area for each of the inspection areas in step S602 and, before step S608, determines which of the inspection areas the pixel of interest belongs to and acquires the size of the comparison area corresponding to the inspection area that the pixel of interest belongs to. This processing can achieve both the quality and the productivity of printed products.

The reference image data acquisition unit 401 according to the present exemplary embodiment acquires the reference image data stored in advance in the storage device 204. Alternatively, the reference image data may be generated before the inspection processing. For example, instead of acquiring the reference image data stored in the storage device 204 in step S603, the printing apparatus 290 may be operated to acquire a desired number of pieces of printed image data, and the reference image data may be generated based on the acquired pieces of printed image data.

In the present exemplary embodiment, the difference in average pixel value between the comparison areas is calculated as the degree of variation in average density. Alternatively, the difference in median pixel value between the comparison areas may be calculated.

In the present exemplary embodiment, an edge image acquired by the edge extraction processing on the reference image is used to correct the size of the comparison area, but a feature other than the edge may be used. For example, the dispersion (or variability) in the pixel values in the comparison area is calculated, and processing for reducing the size of the comparison area is performed in a case where the dispersion is a predetermined threshold value or more. The size of the comparison area may be corrected by repeating this processing until the dispersion in the pixel values in the comparison area becomes less than the predetermined threshold value.

In the present exemplary embodiment, the size of the comparison area is reduced to prevent the inclusion of the print area in the comparison area. Alternatively, the shape of the comparison area may be changed. For example, as illustrated in FIGS. 13A to 13D, the shape of the comparison area may be selected from a plurality of predetermined shapes so as not to include an edge area in the comparison area, based on the edge image corresponding to the reference image. Furthermore, both the size and the shape of the comparison area may be changed so as not to include an edge area in the comparison area.

Figure 14A:
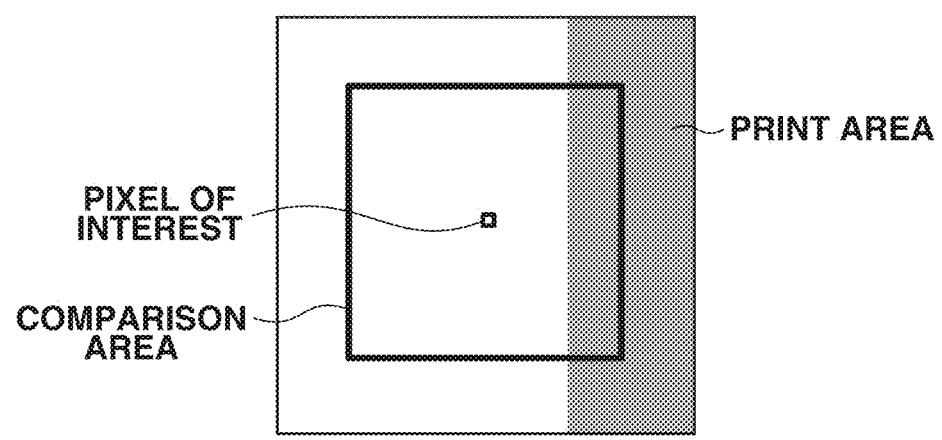
FIGS. 14A and 14B are schematic diagrams illustrating processing for correcting a location of the comparison area.
Figure 14B:
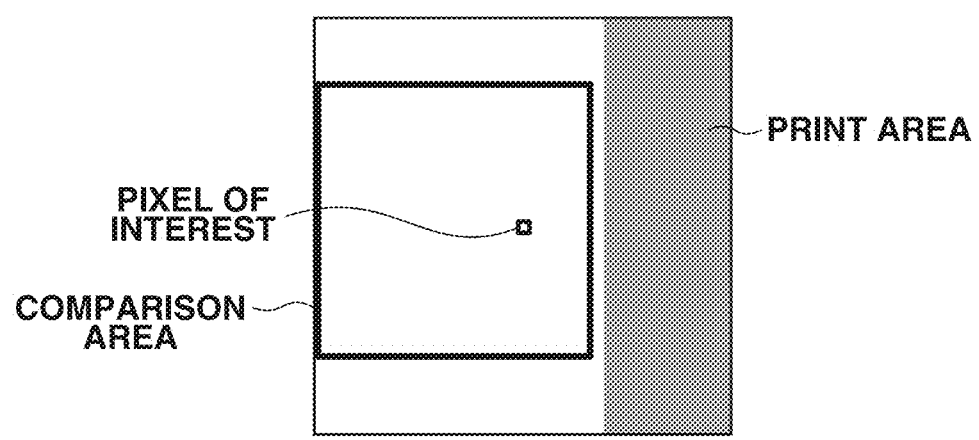

In the present exemplary embodiment, the size of the comparison area is reduced to prevent the inclusion of the print area in the comparison area. Alternatively, the location of the comparison area may be shifted. The comparison area illustrated in FIG. 14A is moved to the location of the comparison area illustrated in FIG. 14B based on the location of the edge in the edge image, thereby preventing the inclusion of the print area in the comparison area.

In the present exemplary embodiment, the difference D (x, y) is calculated by subtracting the degree of variation in average density between the comparison areas from the difference between the pixel values of the pixels of interest. Alternatively, the subtraction may not be performed in a case where the degree of variation exceeds a predetermined threshold value. Accordingly, in a case where the degree of variation cannot be visually ignored, the degree of variation can be detected as a defect.

In the present exemplary embodiment, the difference in average pixel value between the comparison areas is subtracted from the difference between the pixel values of the pixels of interest so that the degree of variation in average density between the comparison areas does not affect the inspection. Instead of this subtraction processing, the threshold value to be used in the processing of step S612 may be corrected. For example, the difference D (x, y) is regarded as the difference between the pixel values of the pixels of interest, and in step S612, the inspection processing unit 407 may, for example, add the difference in average pixel value between the comparison areas to the predetermined threshold value to set the threshold value to a value larger than the difference in average pixel value.

The inspection processing unit 407 according to the present exemplary embodiment calculates the difference D (x, y) in step S610. Alternatively, the processing of step S610 may be divided into a plurality of steps. For example, as expressed in Equation (2), the difference between the pixel values of the pixels of interest may be calculated first, and then the difference between the average pixel values of the comparison areas may be subtracted from the difference between the pixel values of the pixels of interest. In addition, as expressed in Equation (3), the difference between the average pixel values of the comparison areas may be subtracted from the pixel value of the pixel of interest in the printed image first, and then the pixel value of the pixel of interest in the reference image may be subtracted from the subtraction result. Furthermore, as expressed in Equation (4), the difference between the average pixel values of the comparison areas may be subtracted from the pixel value of the pixel of interest in the reference image first, and then the subtraction result may be subtracted from the pixel value of the pixel of interest in the printed image. Moreover, as expressed in Equation (5), the average pixel values of the comparison areas may be subtracted respectively from the pixel values of the pixels of interest in the printed image and the reference image first, and after the subtraction processing, the difference between the pixel values of the pixels of interest may be calculated.

$$D(x,y)=P(x,y)-R(x,y)$$

$$D'(x,y)=D(x,y)-(mp-mr) \quad (2)$$

$$P'(x,y)=P(x,y)-(mp-mr)$$

$$D(x,y)=P'(x,y)-R(x,y) \quad (3)$$

$$R'(x,y)=R(x,y)-(mp-mr)$$

$$D(x,y)=P(x,y)-R(x,y) \quad (4)$$

$$P'(x,y)=P(x,y)-mp$$

$$R'(x,y)=R(x,y)-mr$$

$$D(x,y)=P'(x,y)-R(x,y) \quad (5)$$

The image reading device 205 according to the present exemplary embodiment is a scanner for scanning an image, but may be an image capturing device that captures an image to generate image data.

The above-described exemplary embodiments of the present disclosure can be implemented by processing in which a program for implementing one or more functions according to the above-described exemplary embodiments is supplied to a system or an apparatus via a network or a storage medium, and one or more processors in a computer of the system or the apparatus read and execute the program. In addition, the exemplary embodiments of the present disclosure can also be implemented by a circuit (e.g., an application specific integrated circuit (ASIC)) for implementing one or more functions according to the exemplary embodiments.

According to the exemplary embodiments of the present disclosure, the print output of a printing apparatus can be inspected with high accuracy even in a case where there is no clear change in the printing apparatus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-046694, filed Mar. 17, 2020, which is hereby incorporated by reference herein in its entirety.

What is claimed is:

1. An image processing apparatus comprising:
one or more processors; and
one or more memories storing instructions that, when executed by the one or more processors, cause the one or more processors to operate as:
a first acquisition unit configured to acquire first data that is data of a reference image representing reference of inspection;
a second acquisition unit configured to acquire second data that is data of a printed image to be inspected;
a setting unit configured to set a comparison area including a pixel of interest in each of the reference image and the printed image based on the first data, wherein the pixels of interest in the reference image and the printed image correspond to an identical pixel position;
a calculation unit configured to calculate a density difference between the comparison areas in the reference image and the printed image based on the first data and the second data; and
a processing unit configured to inspect the printed image based on a result of subtracting the density difference from a difference between a pixel value of the pixel of interest in the reference image and a pixel value of the pixel of interest in the print image.

2. The image processing apparatus according to claim 1, wherein the setting unit sets the comparison area based on a size of a defect to be detected, and
wherein the setting unit sets the comparison area so that the larger the size of the defect is, the larger the comparison area is.

3. The image processing apparatus according to claim 1, wherein the setting unit sets the comparison area based on a contrast between a defect to be detected and a background, and
wherein the setting unit sets the comparison area so that the smaller the contrast is, the larger the comparison area is.

4. The image processing apparatus according to claim 1, wherein the setting unit sets the comparison area based on a feature in an area including and around the pixel of interest in the reference image.

5. The image processing apparatus according to claim 1, wherein the setting unit sets the comparison area so that an edge in an area including and around the pixel of interest in the reference image is not included in the comparison area.

6. The image processing apparatus according to claim 1, wherein the setting unit sets the comparison area so as to reduce dispersion in pixel values in an area including and around the pixel of interest in the reference image.

7. The image processing apparatus according to claim 1, wherein the setting unit sets a size of the comparison area.

8. The image processing apparatus according to claim 1, wherein the setting unit sets a shape of the comparison area.

9. The image processing apparatus according to claim 1, wherein the setting unit sets a location of the comparison area.

10. The image processing apparatus according to claim 1, wherein the calculation unit calculates, as the density difference, a difference between an average pixel value of the comparison area in the reference image and an average pixel value of the comparison area in the printed image.

11. The image processing apparatus according to claim 1, wherein the calculation unit calculates, as the density difference, a difference between a median pixel value of the comparison area in the reference image and a median pixel value of the comparison area in the printed image.

12. The image processing apparatus according to claim 1, wherein the processing unit inspects the printed image by determining whether the density difference is a predetermined threshold value or more.

13. The image processing apparatus according to claim 1, wherein in a case where the processing unit determines that the density difference is a predetermined threshold value or more, the processing unit does not subtract the density difference from the difference between a pixel value of the pixel of interest in the reference image and a pixel value of the pixel of interest in the print image.

14. The image processing apparatus according to claim 1, wherein the processing unit inspects the printed image by comparing the result of subtracting with a threshold value.

15. A non-transitory computer-readable storage medium storing instructions that, when executed by a computer, cause the computer to perform an image processing method comprising:
acquiring first data that is data of a reference image representing reference of inspection;
acquiring second data that is data of a printed image to be inspected;
setting a comparison area including a pixel of interest in each of the reference image and the printed image based on the first data, wherein the pixels of interest in the reference image and the printed image correspond to an identical pixel position;
calculating a density difference between the comparison areas in the reference image and the printed image based on the first data and the second data; and
inspecting the printed image based on a result of subtracting the density difference from a difference between a pixel value of the pixel of interest in the reference image and a pixel value of the pixel of interest in the print image.

16. An image processing method comprising:
acquiring first data that is data of a reference image representing reference of inspection;
acquiring second data that is data of a printed image to be inspected;
setting a comparison area including a pixel of interest in each of the reference image and the printed image based on the first data, wherein the pixels of interest in the reference image and the printed image correspond to an identical pixel position;
calculating a density difference between the comparison areas in the reference image and the printed image based on the first data and the second data; and
inspecting the printed image based on a result of subtracting the density difference from a difference between a pixel value of the pixel of interest in the reference image and a pixel value of the pixel of interest in the print image.

17. An image processing apparatus comprising:
one or more processors; and
one or more memories storing instructions that, when executed by the one or more processors, cause the one or more processors to operate as:
a first acquisition unit configured to acquire first data that is data of a reference image representing reference of inspection;
a second acquisition unit configured to acquire second data that is data of a printed image to be inspected;
a setting unit configured to set a comparison area including a pixel of interest in each of the reference image and the printed image based on the first data, wherein the pixels of interest in the reference image and the printed image correspond to an identical pixel position;
a calculation unit configured to subtract a density of the comparison areas in the reference image from a pixel value of the pixel of interest in the reference image and subtract a density of the comparison areas in the printed image from a pixel value of the pixel of interest in the printed image based on the first data and the second data; and
a processing unit configured to inspect the printed image based on a difference between results of subtracting by the calculation unit.

18. The image processing apparatus according to claim 17,
wherein the setting unit sets the comparison area based on a size of a defect to be detected, and
wherein the setting unit sets the comparison area so that the larger the size of the defect is, the larger the comparison area is.

19. A non-transitory computer-readable storage medium storing instructions that, when executed by a computer, cause the computer to perform an image processing method comprising:
acquiring first data that is data of a reference image representing reference of inspection;
acquiring second data that is data of a printed image to be inspected;
setting a comparison area including a pixel of interest in each of the reference image and the printed image based on the first data, wherein the pixels of interest in the reference image and the printed image correspond to an identical pixel position;
subtracting a density of the comparison areas in the reference image from a pixel value of the pixel of interest in the reference image and subtracting a density of the comparison areas in the printed image from a pixel value of the pixel of interest in the printed image based on the first data and the second data; and
inspecting the printed image based on a difference between results of subtracting by the calculation unit.

20. An image processing method comprising:
acquiring first data that is data of a reference image representing reference of inspection;
acquiring second data that is data of a printed image to be inspected;

setting a comparison area including a pixel of interest in each of the reference image and the printed image based on the first data, wherein the pixels of interest in the reference image and the printed image correspond to an identical pixel position;

subtracting a density of the comparison areas in the reference image from a pixel value of the pixel of interest in the reference image and subtracting a density of the comparison areas in the printed image from a pixel value of the pixel of interest in the printed image based on the first data and the second data; and inspecting the printed image based on a difference between results of subtracting by the calculation unit.

* * * * *